(12) United States Patent
Canedo et al.

(10) Patent No.: US 12,210,331 B2
(45) Date of Patent: Jan. 28, 2025

(54) AUTOMATION ENGINEERING LEARNING FRAMEWORK FOR COGNITIVE ENGINEERING

(71) Applicant: Siemens Aktiengesellschaft, Munich (DE)

(72) Inventors: Arquimedes Martinez Canedo, Plainsboro, NJ (US); Di Huang, Los Angeles, CA (US); Palash Goyal, Los Angeles, CA (US)

(73) Assignee: Siemens Aktiengesellschaft, Munich (DE)

( * ) Notice: Subject to any disclaimer, the term of this patent is extended or adjusted under 35 U.S.C. 154(b) by 387 days.

(21) Appl. No.: 17/632,247

(22) PCT Filed: Aug. 11, 2020

(86) PCT No.: PCT/US2020/045722
§ 371 (c)(1),
(2) Date: Feb. 2, 2022

(87) PCT Pub. No.: WO2021/034539
PCT Pub. Date: Feb. 25, 2021

(65) Prior Publication Data
US 2022/0276628 A1    Sep. 1, 2022

Related U.S. Application Data

(60) Provisional application No. 62/887,822, filed on Aug. 16, 2019.

(51) Int. Cl.
*G05B 19/05* (2006.01)
*G06N 20/00* (2019.01)

(52) U.S. Cl.
CPC .......... *G05B 19/056* (2013.01); *G06N 20/00* (2019.01); *G05B 2219/13004* (2013.01)

(58) Field of Classification Search
CPC ................ G05B 19/042; G05B 19/056; G05B 2219/13004; G06F 40/30; G06F 8/34;
(Continued)

(56) References Cited

U.S. PATENT DOCUMENTS 11,157,246 B2 * 10/2021 Zhang ................... G06N 3/08
11,461,081 B2 * 10/2022 Zhang ................... G06F 8/34
(Continued)

FOREIGN PATENT DOCUMENTS

| CN | 101424944 A | 5/2009 |
| CN | 107850893 A | 3/2018 |

(Continued)

OTHER PUBLICATIONS

Code Embedding: A Comprehensive Guide, by Aayush Mittal, published Jul. 3, 2024 in Unite.AI; printed from the Internet on Sep. 24, 2024; 7 pages (Year: 2024).*
(Continued)

*Primary Examiner* — Ronald D Hartman, Jr.

(57) ABSTRACT

Applications of artificial intelligence (AI) in industrial automation have focused mainly on the runtime phase due to the availability of large volumes of data from sensors. Methods, systems, and apparatus that can use machine learning or artificial intelligence (AI) to complete automation engineering tasks are described herein.

18 Claims, 7 Drawing Sheets

(58) Field of Classification Search
CPC .. G06F 8/36; G06F 8/71; G06F 8/447; G06N 20/00; G06N 16/00
USPC ........................................... 700/117
See application file for complete search history.

(56) References Cited

U.S. PATENT DOCUMENTS

| | | | |
|---|---|---|---|
| 11,579,868 B1 * | 2/2023 | Zhang | G06F 8/72 |
| 11,681,541 B2 * | 6/2023 | Mostafa | G06F 8/75 |
| | | | 717/106 |
| 11,720,804 B2 * | 8/2023 | Gupta | G06F 8/75 |
| | | | 706/54 |
| 11,822,909 B2 * | 11/2023 | Zhang | G06F 8/33 |
| 11,836,068 B2 * | 12/2023 | Raszka | G06N 20/00 |
| 2017/0017221 A1 | 1/2017 | Lamparter et al. | |

FOREIGN PATENT DOCUMENTS

| | | | | |
|---|---|---|---|---|
| CN | 109977205 A | 7/2019 | | |
| WO | 20180140365 A1 | 8/2018 | | |
| WO | WO-2021021500 A1 * | 2/2021 | ............... | G06F 8/33 |

OTHER PUBLICATIONS

International Search Report corresponding to PCT application No. PCT/US2020/045722; 10 pages.

* cited by examiner

```
void setup()
{
  Serial.begin(9600);
  pinMode(A2,OUTPUT);
  pinMode(A3,OUTPUT);
  pinMode(A4,OUTPUT);
  pinMode(A0,INPUT);
}
void loop()
{
  sensorval = analogRead(A0);
  led = map(sensorval, 300,1024,0,255);
  Serial.println(led);
  delay(10);
  analogWrite(A2,led);
  analogWrite(A3,led);
  analogWrite(A4,led);
}
```

502

```
void setup()
{
  Serial.begin(9600);
  pinMode(led1, OUTPUT);
  pinMode(led2, OUTPUT);
  pinMode(led3, OUTPUT);
}
void loop()
{
  int senzorNivo1 = analogRead(A0);
  int senzorNivo2 = analogRead(A1);
  int senzorNivo3 = analogRead(A2);
  osvetljaj1 = (senzorNivo1 + 100) /4;
  osvetljaj2 = (senzorNivo2 + 100) /4;
  osvetljaj3 = (senzorNivo3 + 100) /4;
  analogWrite(led1, 255 - osvetljaj1);
  analogWrite(led2, 255 - osvetljaj2);
  analogWrite(led3, 255 - osvetljaj3);
  Serial.print(senzorNivo1);
  Serial.print(" ");
  Serial.print(senzorNivo2);
  Serial.print(" ");
  Serial.println(senzorNivo3);
  delay(100);
}
```

504

Key:
- Syntax similarity
- Sensor read
- Sensor scaling
- Time control

AUTOMATION ENGINEERING LEARNING FRAMEWORK FOR COGNITIVE ENGINEERING

CROSS-REFERENCE TO RELATED APPLICATIONS

This application is a national phase filing under 35 U.S.C. § 371 of International Patent Application No. PCT/US2020/045722, filed Aug. 11, 2020, which claims the benefit of priority to U.S. Provisional Patent Application Ser. No. 62/887,822, filed Aug. 16, 2019, which are incorporated herein by reference in their entirety.

This application claims the benefit of U.S. Provisional Application No. 62/887,822 filed Aug. 16, 2019, the disclosure of which is incorporated by reference in its entirety.

BACKGROUND

Industrial automation is undergoing a technological revolution of smart production enabled by recent breakthroughs in intelligent robotics, sensors, big data, advanced materials, edge supercomputing, internet of things, cyber-physical systems, and artificial intelligence. These systems are currently being integrated by software into factories, power grids, transportation systems, buildings, homes, and consumer devices. The lifecycle of industrial automation systems can be divided into two phases: engineering and runtime. The engineering phase refers to the activities that occur before the system is in operation. These engineering activities can include hardware selection, hardware configuration, automation code development, testing, and simulation. The runtime phase, on the other hand, refers to the activities that occur during the system's operation. Example runtime activities include control, signal processing, monitoring, prognostics, etc.

Applications of artificial intelligence (AI) in industrial automation have focused mainly on the runtime phase due to the availability of large volumes of data from sensors. For example, time series forecasting algorithms have been very successful in signal processing. Planning and constraint satisfaction are used in controls and control code generation. Anomaly detection algorithms are becoming very popular in system monitoring against cyber-attacks. Probabilistic graphical models and neural networks are used for prognostics and health management of complex cyber-physical systems, such as wind and gas turbines.

It is recognized herein, however, that the use of AI in the engineering phase is underdeveloped due to various technical issues related to applying AI in the engineering phase.

BRIEF SUMMARY

Embodiments of the invention address and overcome one or more of the described-herein shortcomings by providing methods, systems, and apparatus that can use machine learning or artificial intelligence (AI) to complete automation engineering tasks.

In an example aspect, a computing system, for instance an automation engineering system, can perform various automation engineering tasks using machine learning. The system can train a neural network based on automation source code. For instance, a neural network of a learning module can be configured to learn programmable logic controller (PLC) source code for programmable logic controllers (PLCs) and automation source code for manufacturing systems. The system can generate code embeddings based on the training. For example, the learning module can be configured to, based on learning the PLC source code and the automation source code, generate code embeddings that define snippets of PLC source code and snippets of automation source code as respective vectors in space. Based on the code embeddings, the system can determine a category associated with a particular snippet of code. Alternatively, or additionally, based on the code embeddings, the system can determine that a different snippet of code is similar to a given snippet of source code. In particular, in some cases, a semantic code search module can generate a score associated with a neighbor as compared to the vectors in space defined by the source code, so as to determine that the different snippet of code is similar to the given source code (e.g., PLC source code or automation source code) in terms of code syntax or code function. In some cases, the semantic code search module can be further configured to score the neighbor as compared to the vectors in space so as to determine that the different snippet of code is similar to the snippet of source code (e.g., PLC source code or automation source code) in terms of code function, and dissimilar in terms of code syntax.

In another example aspect, the system can generate a probability distribution associated with hardware components based on a partial hardware configuration. For example, a hardware recommendation module can be configured to learn hardware configurations for completing automation engineering tasks. The hardware recommendation module can be further configured to receive a partial hardware configuration. Based on learning the hardware configurations, the hardware recommendation module can determine a plurality of hardware components and respective probabilities associated with the plurality of hardware components. The respective probabilities can define select hardware components of the plurality of hardware components that complete the partial hardware configuration, so as define a full hardware configuration for completing an automation engineering task.

BRIEF DESCRIPTION OF THE SEVERAL VIEWS OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

As an initial matter, it is recognized herein that various issues have limited the capabilities to-date related to applying AI to the engineering phase of industrial automation. As one example, engineering data is generally scarce because of its proprietary nature. As another example, the duration of the engineering phase is typically short as compared to the runtime phase. By way of example, some industrial automation systems are in operation for more than 30 years. Therefore, the engineering phase is often considered less important than the runtime phase. As yet another example, acquiring human intent and knowledge is often a difficult technical challenge. Capturing engineering know-how in expert systems can be time consuming and expensive. It is recognized herein, though, that manufacturing is transforming itself from centralized mass production into a distributed lot size one production. Such a transformation can increase the cost of the engineering phase relative to the total cost of automation, even if the engineering phase is short in time duration relative to the runtime phase.

It is further recognized herein, however, that automation engineering involves various technical challenges that distinguish it from general purpose software. As an example, software development for automation engineering is often done by automation engineers instead of software experts, which can result in non-reusable and imprecise codes. Further, the interaction of automation engineering software (AES) with the physical world often requires the engineers to understand the hardware configuration that defines how sensors, actuators, and other hardware are connected to the digital and analog inputs and outputs of a given system. Thus, defining the hardware configuration for development of engineering tools can require multiple iterations between the hardware and software development. Such a tight coupling between hardware and software products can result in longer development cycles, among other effects, for AES.

In accordance with various embodiments described herein, automation engineering tasks are performed with machine learning. In particular, for example, code classifications, semantic code searches, and hardware recommendations can be performed using machine learning in accordance with embodiments described herein. Code classification generally refers to organizing existing and new code into function libraries, for example, with code functions for different categories. Example categories include, without limitation, signal processing, signal generation, and robot motion control. In some cases, as production demands change, there can be a need to efficiently integrate new functionality into production. As another example, frequent reconfigurations of the production system can demand a higher degree of code reusability. It is recognized herein that semantic code search can, for example, help the productivity of engineers by allowing them to find functionally equivalent code. In some cases, similar code can inform their decision making when writing software to automate hardware they never experienced before. With respect to the task of hardware recommendations, automation engineering includes the task of integrating various hardware components with software to achieve a production goal. Therefore, selecting good hardware configurations can be a critical activity. In an example embodiment, a system can recommend hardware so as to assist the engineers with hardware configuration auto-completion. For example, in some cases, given a partial hardware configuration, the system can predict the full hardware configuration.

Figure 1:
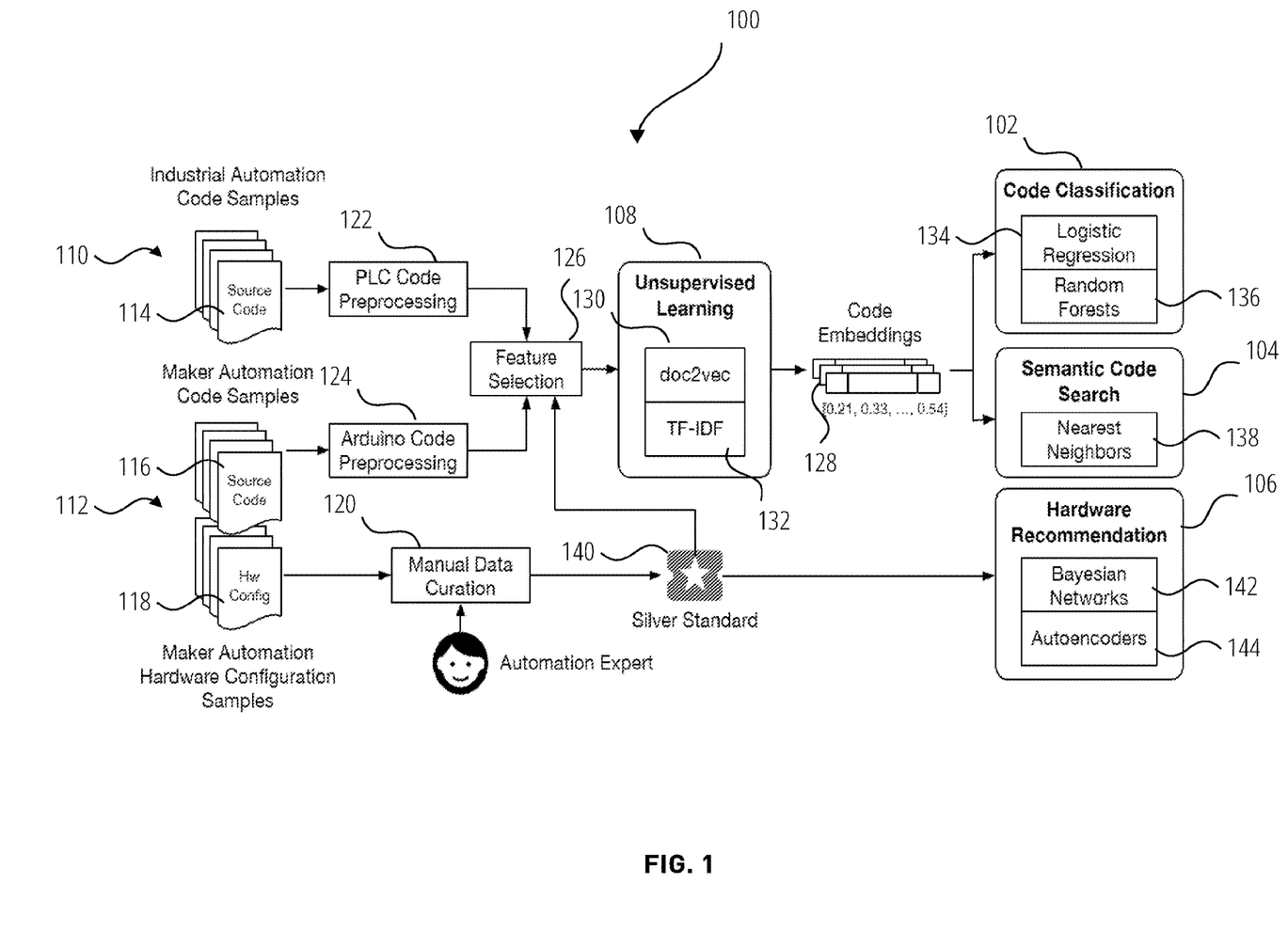
FIG. 1 is a block diagram of an example automation engineering system configured to learn automation code and hardware so as to automate automation engineering tasks, in accordance with various embodiments described herein.

Referring now to FIG. 1, an example architecture or automation engineering system 100 can perform automation engineering tasks, in accordance with various embodiments described herein. The system 100 includes a code classification module 102, a semantic code search module 104, and a hardware recommendation module 106 configured to perform various automation engineering tasks, as described herein. The system 100 further includes a learning module 108, which can include one or more neural networks.

The system 100 may include one or more processors and a memory having stored applications, agents, and computer program modules to implement the embodiments of this disclosure including the learning module 108, the code classification module 102, the semantic code search module 104, and the hardware recommendation module 106, among others. A module may refer to a software component that performs one or more functions. Each module may be a discrete unit, or the functionality of multiple modules can be combined into one or more units that form part of a large program.

Various data can be collected for training the learning module 108. In an example, the learning module 108 can be trained on an industrial data set 110 and a maker data set 112. The industrial data set 110 can include source code 114 used by industrial automation systems. In particular, for example, the source code 114 can include programs for programmable logic controllers (PLCs). The maker data set 112 can include source code 116 and hardware configuration data 118 from manufacturing automation systems. In an example use case, the source code 116 and hardware configuration data 118 can include data collected from public sources such as, for instance, the Arduino Project Hub at create.arduino.cc. Example test datasets are referenced throughout this disclosure to illustrate example results generated by the system 100, though it will be understood that embodiments are not limited to the example data sets and the example results from the example data sets. In particular, the example data sets include 2,927 Arduino projects and 683 PLC projects. Various source code 116 and/or hardware configuration data 118 can be associated with a respective project. Further, the maker data set 112 can include various metadata that indicates various information related to respective code or data, such as, for example and without limitation, a category of the project related to specific code, a title of the project, an abstract, various tags or description of the project, and hardware configurations (e.g., components and supplies). In an example, the maker data set 112 includes data that is associated with multiple projects, and each of the multiple projects is categorized, such that each project is associated with a category. In an example, the code classification module 102 uses the categories of projects as labels. As further described herein, the code classification module 102 can apply a label to given code, so as to predict the classification of the code. In some cases, a given project's title, abstract, tags, and description metadata can provide an upper baseline for label classifications. That is, for example, providing additional features may improve the predictive performance of the machine learning model.

Similarly, the hardware configuration data 118 can be associated with multiple projects. In an example, the hardware configuration data 118 includes lists of components that are required for specific projects. In some examples, the hardware configuration data 118 is curated at a data curation module 120 so as to cleanse the data. The data curation module 120 can perform automated operations so as to cleanse the data. Additionally, or alternatively, an automation expert can cleanse the data at the data curation module 120. By way of example, in an example test case, the hardware configuration data 118 included over 6,500 unique components for 2,927 projects. Continuing with the example, at the data curation module 120, it was determined that some of the 6,500 components were not actually unique. For example, in some cases, the same component was named differently in different lists (e.g., "resister 10 k" vs. "Resistor 10 k ohm"). Such naming discrepancies can be removed at the data curation module 120. In some examples, the components can be renamed in accordance with their functionality, so as to curate the hardware configuration data 118. In particular, for example, functional levels of abstraction can be defined for the hardware so as to properly name components. Example categories in an example first level of abstraction (e.g., level-1) can include, without limitation, Actuators, Arduino, Communications, Electronics, Human Machine Interface, Materials, Memory, Power, and Sensors. Example categories in a second or finer level of abstraction (e.g., level-2) can include, without limitation: Actuators {acoustic, air, flow, motor}, Arduino {large, medium, other, small}, Communications, {ethernet, optical, radio, serial, wifi}, Electronics {capacitor, diode, relay, resistor, transistor}, Human Machine Interface {button, display, input, led}, Materials {adapter, board, screw, solder, wiring}, Memory {solid}, Power {battery, regulator, shifter, supply, transformer}, and Sensors {accel, acoustic, camera, encoder, fluid, gps, mise, optical, photo, pv, rfid, temp}.

Although two levels of abstraction for classifying hardware components are presented for purposes of example, it will be understood that the hardware can be abstracted into additional or alternative levels so as to curate the data, and all such data curation is contemplated as being within the scope of this disclosure. Furthermore, although specific classifications are presented for purposes of example, it will be understood that hardware components may be classified in accordance with alternative, fewer, and/or additional classifications, and all such classifications are contemplated as being within the scope of this disclosure.

Similar to the maker data set 112, the industrial data set 110 can include data collected from public sources. For example, PLC code can be collected from the OSCAT library at www.oscat.de, which is a publicly available library of PLC programs that is vendor independent. Reusable code functions in different categories, such as signal processing (SIGPRO), geometry calculations (GEOMETRY), and string manipulation (STRINGS), can be found at the OSCAT library. In an example, the source code 114 that is collected can include its associated category, for instance in a comment section of the file. These categories can be extracted, and can be used as labels by the code classification module 102. In an example, the source code 114 is written in SCL language, though it will be understood that embodiments are not limited as such.

With continuing reference to FIG. 1, the code classification module 102 can, given a snippet of code, predict the label associated with the code. In some cases, before the code is input into the code classification module 102, it is preprocessed at one or more preprocessing modules, for instance a first or PLC code preprocessor 122 or a second code preprocessor 124. For example, the PLC code preprocessor 122 can process the source code 114 so as to extract various features from the source code 114. Similarly, the second code preprocessor 124 can process the source code 116 and so as to extract various features. By way of example, the preprocessors 122 and 124 can discard comments and/or references to hardware, so that the learning module 108 is input with high quality data. Table 1 below illustrates example features that can be extracted at the PLC code preprocessor 122 and the second code preprocessor 124. In the example, the maker data set 112 contains more features than the industrial data set 110, thus there are features available in the maker data set 112 that are not available in the industrial data set 110. In particular, the example source code 114 does not contain includes and project data such as tags, title, descriptions, and components. It will be understood, however, that the features in Table are presented as an example, and alternative or additional features can be extracted in accordance with other example embodiments.

TABLE 1

| Feature | Arduino | PLC | Description |
| --- | --- | --- | --- |
| Includes | ✓ | — | C/C ++ includes |
| Functions | ✓ | ✓ | Function names |
| Comments | ✓ | ✓ | Comments in code |
| Tokens | ✓ | ✓ | All code tokens |
| Code | ✓ | ✓ | Code keywords |
| LOC | ✓ | ✓ | Lines of code |
| Tags | ✓ | — | Project tags |
| Title | ✓ | — | Project title |
| Descriptions | ✓ | — | Project descriptions |
| Labels | ✓ | ✓ | Labels to predict |
| Components | ✓ | — | Hardware configuration |

With continuing reference to FIG. 1, the system 100 can further include a feature selection module 126 configured to select features from the features that are extracted at the PLC code preprocessor 122 and the second code preprocessor 124. The feature selection module 126 can select different features so as to combine different sets of features with each other, so as to tune the learning module 108 for feature space exploration. Further, the feature selection module 126 can format various features in a manner that is suitable for machine learning. For example, code can be represented by different combinations of features such as includes, functions, comments, tokens, and keywords. By way of further example, code documentation can be represented by combinations of tags, titles, and descriptions. Alternatively, in some cases, code representations and code documentation features can be combined.

Based on the selected features or combination of features from the feature selection module 126, the learning module 108 can generate code embeddings 128. The feature selection module 126 can generate textual representations of selected features, and the learning module 108 can embed those textual representations with vectors, such that the source code 114 and source code 116 are associated with multiple vectors. Thus, the learning module 108 can map code to vectors in space. Further, by way of example, the learning module 108 can map pieces of code that are similar to each other to points in space that are close to each other. The learning module 108 can perform various algorithms or computations so as to generate the code embeddings 128. By way of example, the learning module 108 can include a first or document to vector (doc2vec) processor 130 configured to perform a doc2vec algorithm and a second or term frequency-inverse document frequency (tf-idf) processor 132 configured to perform a tf-idf algorithm, though it will be understood that alternative processors and methods can be implemented to generate the code embeddings 128 as desired.

In an example, code embeddings 128 are generated by the first or doc2vec processor 130 and the second or tf-idf processor 132, and the embeddings are compared to each other. The learning module 108 can perform the doc2vec processor 130 so as to generate hyperparameters of interest, which can include the embedding dimension and the training algorithm (e.g., distributed memory and distributed bag of words). In an example further described herein, the negative sample is 5.

In some examples, after the code embeddings 128 are generated, the code classification module 102 can be trained. In particular, the code classification module 102 can include a supervised neural network or model. The code embeddings 128 can be input into the code classification module 102, such that the code embeddings 128 define input samples. Code labels can be output by the code classification module 102, such that the code labels define target values of the code classification module 102. The target values or code labels can correspond to the categories of the original industrial data set 110 and the maker data set 112. The code classification module 102 can include various classifiers, for instance a logistic regression classifier 134, a random forests classifier 136, or the like. In some cases, the classifiers can be compared, for instance using the $F_1$-score metric. The $F_1$-score generally considers the precision (p) and the recall (r) so as to measure a test's accuracy. Mathematically, the $F_1$-score can be defined as the harmonic mean of the precision (p) and the recall (r). In various examples described herein, the $F_1$-score can be computed as $$F1 = 2 \times \frac{(p \times r)}{(p + r)}.$$

In an example, the code classification module 102 uses lower and upper bounds for the code label classifications. In some cases, the lower bound can be defined by training the code label classifier using random embeddings, and the upper bound can be defined by training the code label classifier using human annotations. In particular, for example, the maker data set 112 can include annotations, for instance tags and descriptions, which can be combined or used independent from each other. In an example, referring to FIG. 2, the annotation configurations, (e.g., tags, descriptions, tags and descriptions) can be embedded in the code embeddings 128 using the doc2vec processor 130 and the tf-idf processor 132, and the label classifications that result from each of the processors 130 and 132 can be compared using respective $F_1$ scores.

Figure 2:
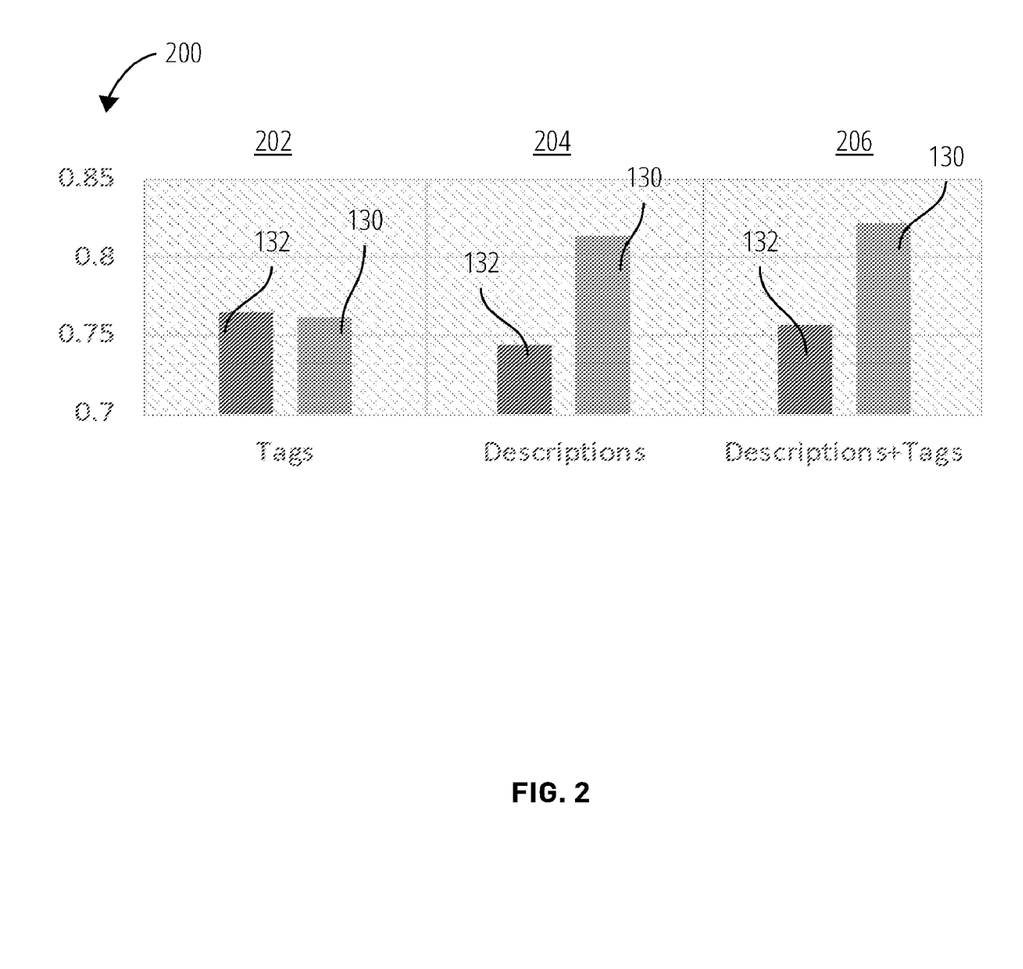
FIG. 2 is a graph that depicts example performance results of the automation engineering system predicting code with human annotations.

Referring also to FIG. 2, example $F_1$ scores 200 are shown for the doc2vec processor 130 and tf-idf processor 132. In particular, $F_1$ scores 200 are shown for a tags annotation configuration 202, a descriptions annotation configuration 204, and a descriptions and tags annotation configuration 206. As shown in FIG. 2, in accordance with the example, the doc2vec processor 130 yields a better performance than the tf-idf processor 132. In the example, the embedding dimension for the doc2vec processor 130 is set to 50, and the tf-idf processor 132 generates embedding dimensions of 1,469 for the tags annotation configuration 202; 66,310 for the descriptions annotation configuration 204; and 66,634 for the descriptions and tags annotation configuration 206.

As shown in the example, the descriptions and tags annotation configuration 206 provides the upper bound for the $F_1$ scores 200 of 0.8213.

Figure 3:
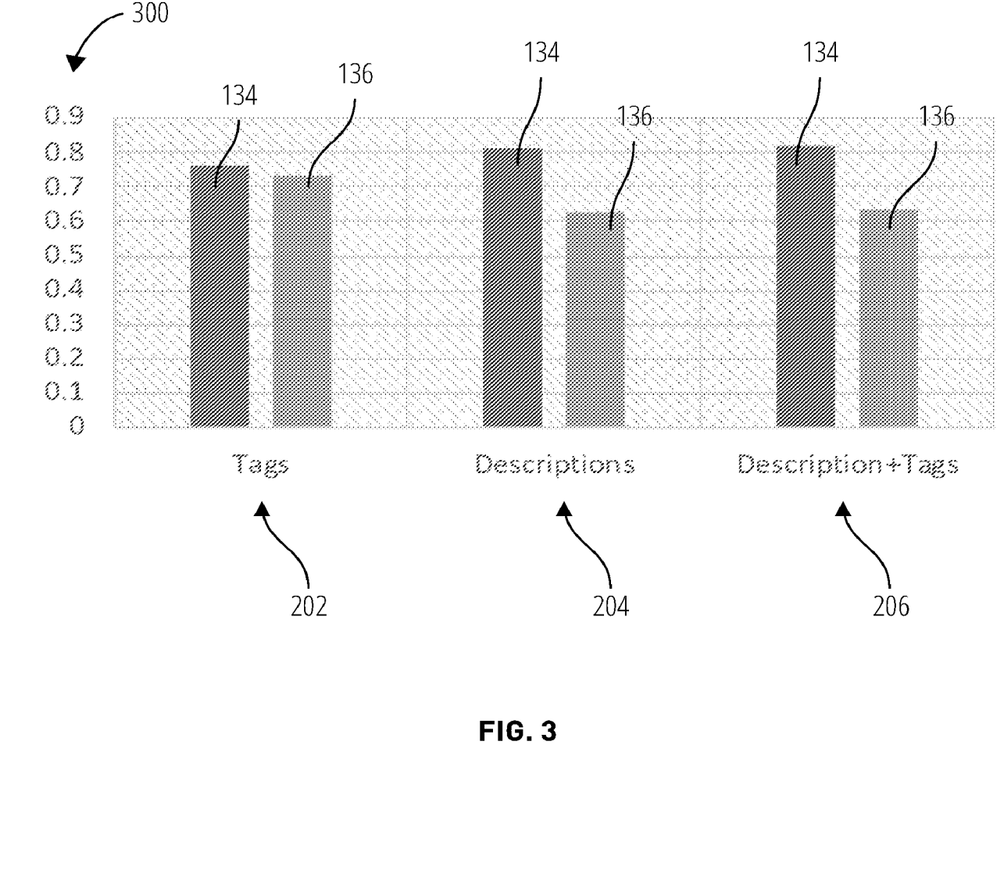
FIG. 3 is a graph that depicts example performance results of different classifiers of the automation engineering system.
Figure 4:
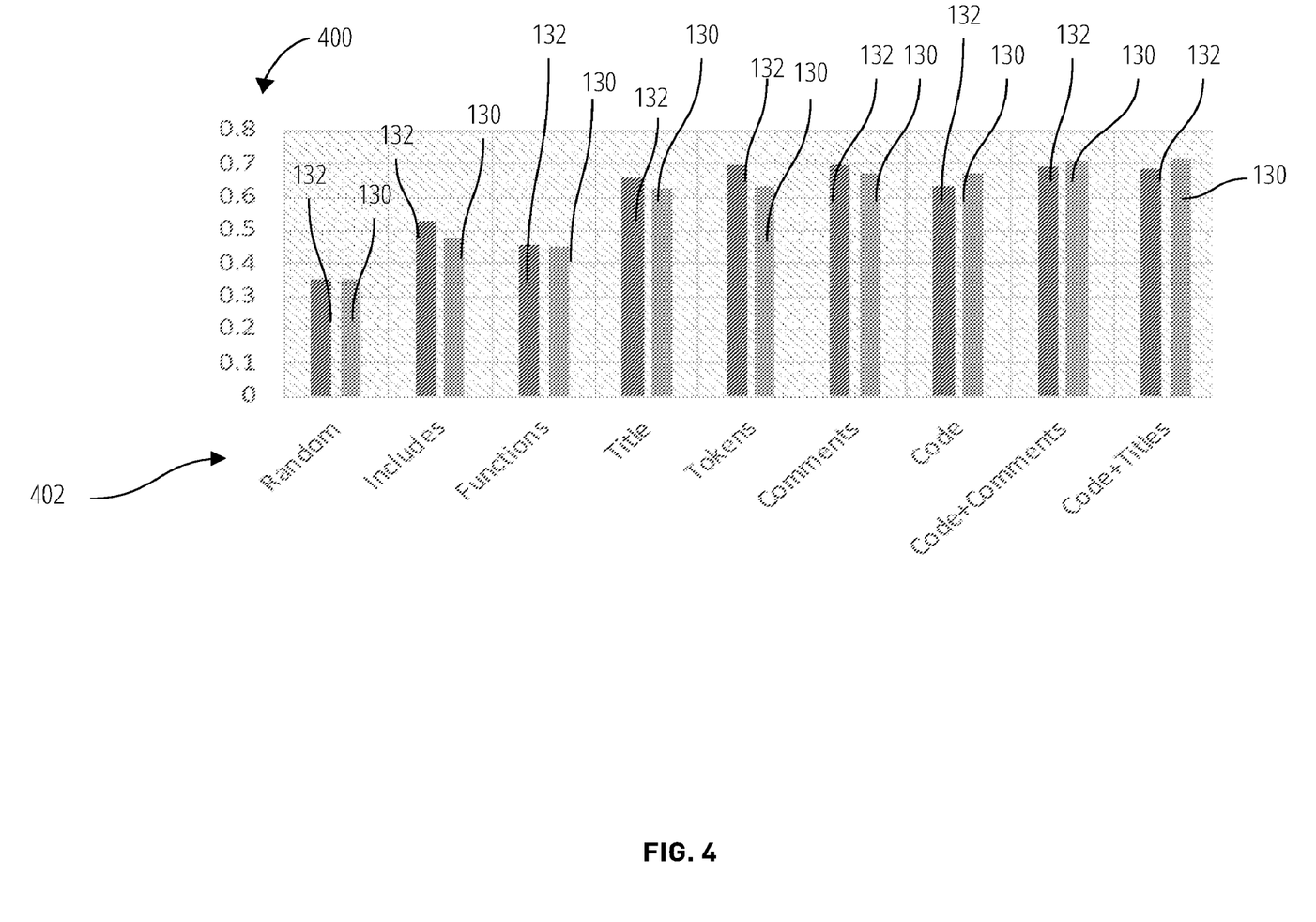
FIG. 4 is a graph that depicts example performance results of the automation engineering system predicting code using code.

Referring also to FIG. 3, example $F_1$ scores 300 are shown that illustrate an example comparison of the performance of the logistic regression classifier 134 and the random forests classifier 136 using the example 50-dimensional code embeddings 128 from the doc2vec processor 130. In the example, the logistic regression classifier 134 performs better than the random forests classifier 136, though it will be understood that performance may vary, for example, based on the input data, among other factors. In the example, the lower bound can be established by generating 50-dimensional random code embeddings 128 and predicting the labels using the logistic regression classifier 134. Referring also to FIG. 4, example $F_1$ scores 400 result from the code classification module 102 using code to predict labels. In particular, the example $F_1$ scores 400 indicate that a lower bound of 0.3538 is defined by the tf-idf processor 132 and the doc2vec processor 130. The feature selection module 126 can select example features 402 for predicting labels. In some cases, after establishing the upper and lower bounds, different code features 402 can be used to predict labels. In the example illustrated in FIG. 4, the code embeddings 128 that include the features "includes" and "functions" resulted in a slightly better performance that the random baseline because, for example, limited information contained in those features. In contrast, the code embeddings 128 that include other code features improve the classification accuracy significantly, in accordance with the example. For example, the code embeddings 128 that include the code features "tokens" and "code" resulted in similar $F_1$ scores 400 of 0.63 and 0.67, respectively. The example results of FIG. 4 also illustrate that the comments feature, which has a score 0.67, can contain valuable information that can be used to predict the code label. For example, the code embeddings 128 that include the code and comments combination of features and the code embeddings 128 that include the code and titles combination of features yield the $F_1$ scores 400 of about 0.71, which is the highest score in the example. Thus, without being bound by theory, the prediction performance with code feature embeddings can compare favorably to human annotation embeddings, in accordance with various embodiments.

Referring again to FIG. 1, the system 100 can also include the semantic code search module 104 configured to find programs in response to code or a code snippet, wherein the programs that are found are similar to the code or code snippet. In the context of automation engineering, in accordance with various embodiments, similarity can be defined in terms of syntax and functionality. For example, syntax similarity 504 can help engineers find useful functions in a given context, and functional similarity can inform engineers of other automation solutions have been engineered. In some cases, the doc2vec processor 130 can bring similar documents close to each other in the embedding space (e.g., code embeddings 128). By way of example, for a given code embedding 128 associated with a snippet of source code 116, neighbors nearest to the given code embedding 128 can represent code that is similar to the code snippet. Thus, the semantic code search module 104 can identify one or more nearest neighbors 138 associated with code snippets, based on code embeddings 128 of the code snippets. Further, in accordance with various embodiments, function structure can be captured in the code embeddings 128, and thus the semantic code search module 104 can discover nearest neighbors 138 for not only documents that have similar syntax.

In an example, the quality of the code embeddings 128 is validated by randomly sampling 50 code snippets from the source code 116. In the example, the sample code snippets can be scored based the similarity of each code snippet to its top-3 nearest neighbors. In some cases, for every code snippet pair, similarity ratings for code syntax and code structure are given. By way of example, a rating of 1 can represent similarity, and a rating of 0 can represent a lack of similarity. Code syntax can refer to the use of similar variables and function names. Code structure can refer to the use of similar code arrangement such as, for example, if-then-else and for loops. In an example further described herein, software experts can provide ratings and an associated confidence score. By way of example, and without limitation, the confidence scores can range from 1 (lowest confidence) to 5 (highest confidence). Regardless of the how the score is calculated, the confidence score can represent a given expert's self-assurance during the evaluation. Continuing with the example described herein, during the expert evaluation, 5 out of 50 samples were eliminated. For examples, samples can be eliminated if at least one of the top-3 nearest neighbors is an empty file or contains code in a different programming language than the corresponding code snippet or sample.

Continuing with the example introduced above, Table 2 below shows the average code syntax and code structure similarity scores given by experts. Table 2 includes the high confidence ratings (e.g., avg. confidence ≥4.5) so as to eliminate the influence of uncertain answers. The agreement among the experts can also be measured via the Fleiss Kappa (k). As shown in the example illustrated in Table 2, the similarity scores for both syntax and structure are high for the top-1 neighbors (0.68 and 0.61 respectively) but reduce significantly (under 0.50) for the top-2 and top-3 neighbors. Further, in the example, the experts are in substantial agreement (0.61≤k≤0.80) in their syntax similarity scores, and in agreement (0.41≤k≤0.60) in their structure similarity scores. Thus, in accordance with the example results the code embeddings 128 from the doc2vec processor 130 can capture syntactic similarity and structure similarity.

TABLE 2

| Similarity | Nearest neighbors | | |
|---|---|---|---|
| | Top 1 (k) | Top 2 (k) | Top 3 (k) |
| Syntax | 0.61 (0.75) | 0.48 (0.70) | 0.32 (0.61) |
| Structure | 0.68 (0.53) | 0.40 (0.44) | 0.33 (0.66) |

By way of further example, referring to Table 3 below, in another example use case three similar code snippets are selected, and three dissimilar code snippets are selected. As shown in Table 3, the cosine similarity associated with the code embeddings 128 of the respective code snippets can be measured. The example code snippets shown in Table 30 have an indication of a strong agreement among the experts, and a high confidence in the similarity and lack of similarity across the top-3 nearest neighbors. The results of this example illustrate that the code snippets considered to be most similar as each other by experts are also defined as similar by the semantic code search module 104. In particular, the code snippets considered to be most similar as each other by the experts are also close each other in the code embeddings space defined by the learning module 108. Additionally, the code snippets considered to be most dissimilar as each other by the experts are far apart in the code embedding space defined by the learning module 108.

TABLE 3

| | Nearest neighbors | | |
|---|---|---|---|
| | Top 1 | Top 2 | Top 3 |
| Similar code snippets | | | |
| #2696 | 0.8768 | 0.7527 | 0.7642 |
| #547 | 0.8719 | 0.8705 | 0.8506 |
| #2815 | 0.9465 | 0.9445 | 0.9126 |
| Not Similar code snippets | | | |
| #4512 | 0.5967 | 0.5497 | 0.5643 |
| #4345 | 0.5415 | 0.4175 | 0.5192 |
| #1730 | 0.5970 | 0.5035 | 0.5511 |

Figure 5:
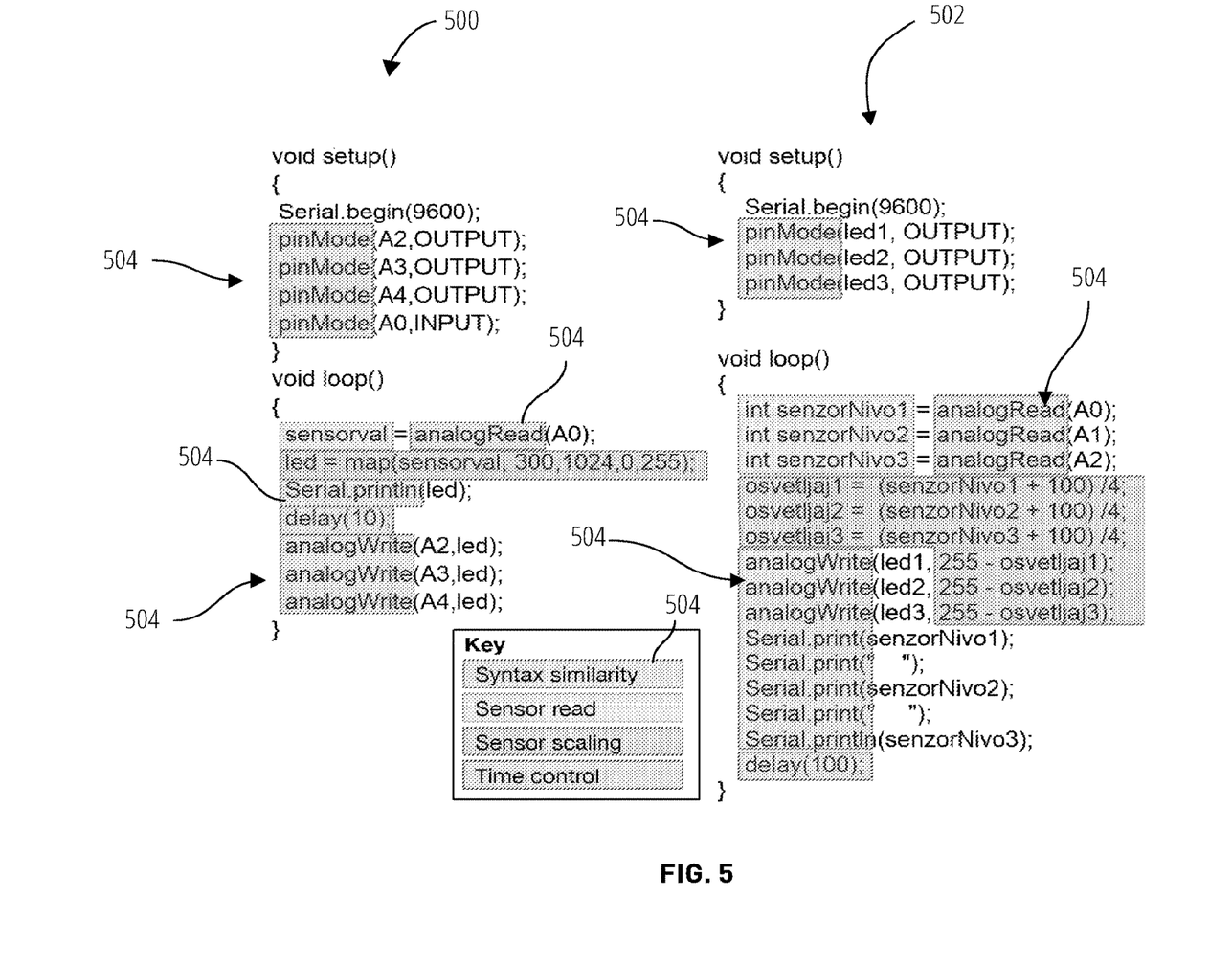
FIG. 5 shows example code snippets that can be input into the automation engineering system so that the automation engineering system can identify similarities between the code snippets.

Referring now to FIG. 5, a first example code snippet 500 and a second example code snippet 502 are shown. The example code snippets 500 and 502 define similar Arduino code snippets produced by the ArduCode of the source code 116. The first and second example code snippets 500 and 502 define similarities at different levels. For example, Arduino programs have the setup( ) and loop( ) functions to initialize the program, and to specify the control logic executed on every cycle. From a syntax perspective, the two example programs use the same example standard functions: OpinMode( ) to configure the Arduino board pins where the hardware connects as inputs or outputs; analogRead( ) to read an analog value from a pin; Serial.print( ) to print an ASCII character via the serial port; delay( ) to pause the program for the amount of time (in ms) specified by the parameter; and analogWrite( ) to write an analog value to a pin.

Still referring to FIG. 5, semantically, the example programs read sensor values (e.g., 1 value in example code snippet 500 and 3 values in example code snippet 502); scale the sensor value to a range (e.g., from 300-1024 to 0-255 using map( ) in example code snippet 50054 and to (x+100)/4 in example code snippet 502); print the scaled sensor value via the serial port; write the analog value to an LED (e.g., a single LED in example code snippet 500 and three LEDs in example code snippet 502); and pause the program (e.g., 10 ms in example code snippet 500 and 100 ms in example code snippet 502). The order in which the above-described operations are scheduled is different in the example programs that include first and second example code snippets 500 and 502. Functionally, the example programs 500 and 502 perform the same task of creating a heatmap for a sensor value using LEDs. While there are some syntactic similarities in the example illustrated by FIG. 5, the semantic code search module 104 can capture semantic and functional similarities between programs or code snippets, in accordance with various embodiments.

Referring again to FIG. 1, the example system 100 can also include the hardware recommendation module 106 that can be configured to predict hardware components for completing a task, given a partial list of hardware components. For example, in some cases, given a partial list of hardware components, the hardware recommendation module 106 can identify other hardware components that are typically used in combination with the partial list. In some examples, the hardware configuration data 118 can be disorganized or inconsistent. In such examples, the hardware configuration data 118 can be scrubbed in the data curation module 120 so as to define silver standard or clean hardware configuration data 140. In some cases, an automation expert can use the data curation module 120 so as to generate silver standard data. The hardware recommendation module 106 can use the clean hardware configuration data 140 to learn a joint probability distribution of the hardware components represented by the hardware configuration data 118. Then, given a partial list of hardware components, the hardware recommendation module 106 can generate a conditional probability associated with respective hardware components being used to complete the partial list. To perform its tasks, the hardware recommendation module 106 can include various machine learning or neural networks. For example, the hardware recommendation module 106 can include a Bayesian network module 142 and an autoencoder module 144.

In an example implementation, the Bayesian network module 142 and the autoencoder module 144 generate predictions or recommendations of hardware based on random hardware configurations defined in the clean hardware configuration data 140. In the example, categories of the clean hardware configuration data 140 define random variables of a Bayesian network that is learned by the Bayesian network module 142. In the example implementation, the Bayesian network module 142 can use Pomegrate to learn the structure of the Bayesian network so as to fit the model with 70% of the clean hardware configuration data 140. In the example, the Bayesian network for level-1 components consists of 9 nodes and the network for level-2 components consist of 45 nodes. It is recognized herein, however, that the initialization of the Bayesian network takes significant time with the number of variables (45) in the level-2 configuration. Therefore, in the example, the autoencoder module 144 is implemented in Keras so as to learn a lower dimensional representation of the clean hardware configuration data 140. A decoder of the autoencoder module 144 can learn to reconstruct the original input from the lower dimensional representation. To avoid overfitting, the autoencoder module 144 can use L1 and L2 regularizers.

In an example, the hardware recommendation module 106 can recommend a predetermined number (represented herein by k) hardware components. Thus, the hardware recommendation module 106 can recommend the top-k hardware components, and the resulting models can be evaluated in terms of precision@k. Precision(p)@k can represent the portion of recommended hardware components in the top-k set that are relevant. In an example described herein that is represented in Table 4 below, for each hardware configuration in the test data, one hardware component is left out and measure its precision@k is measured. Table 4 shows example results for a random baseline, the Bayesian network module 142, and the autoencoder module 144. As shown, the performance of the random baseline improves linearly from p@1=0.1, p@3=0.32, and p@5=0.54 to p@9=1 for the level-1 hardware predictions. The Bayesian Network also improves linearly from p@1=0.32, p@3=0.59, and p@5=0.79. In the example, the autoencoder provides both the best performance and the best improvements from p@1=0.36, p@3=0.79, and p@5=0.95. As shown, the autoencoder's p@3 is the same performance as the Bayesian Network's p@5, 0.79. Additionally, as shown, the autoencoder achieves greater than 0.95 precision at p@5 in the example.

TABLE 4

| p@k | Random Baseline | Bayesian Network | Autoencoder |
|---|---|---|---|
| p@1 | 0.10 | 0.32 | 0.36 |
| p@3 | 0.32 | 0.59 | 0.79 |
| p@5 | 0.54 | 0.79 | 0.95 |
| p@9 | 1.00 | 1.00 | 1.00 |

Continuing with the example, as described above, learning a Bayesian Network for level-2 hardware components can be computationally impractical. Therefore, in the example, the autoencoder module 144 learns the level-2 hardware components so as to define the example p@k results shown in Table 5 below. Referring to Table 5, in accordance with the example, the overall p@k of the autoencoder module 144 for level-2 is comparatively lower than for level-1 because the example level-2 hardware configuration is sparser than level-1. The improvement in the example over the random baseline, however, is 10 times for p@1, 5 times for p@3, 4 times for p@5, and 3 times for p@10.

TABLE 5

| p@k | Random Baseline | Autoencoder |
|---|---|---|
| p@1 | 0.02 | 0.21 |
| p@3 | 0.06 | 0.34 |
| p@5 | 0.11 | 0.45 |
| p@10 | 0.21 | 0.69 |

Figure 6:
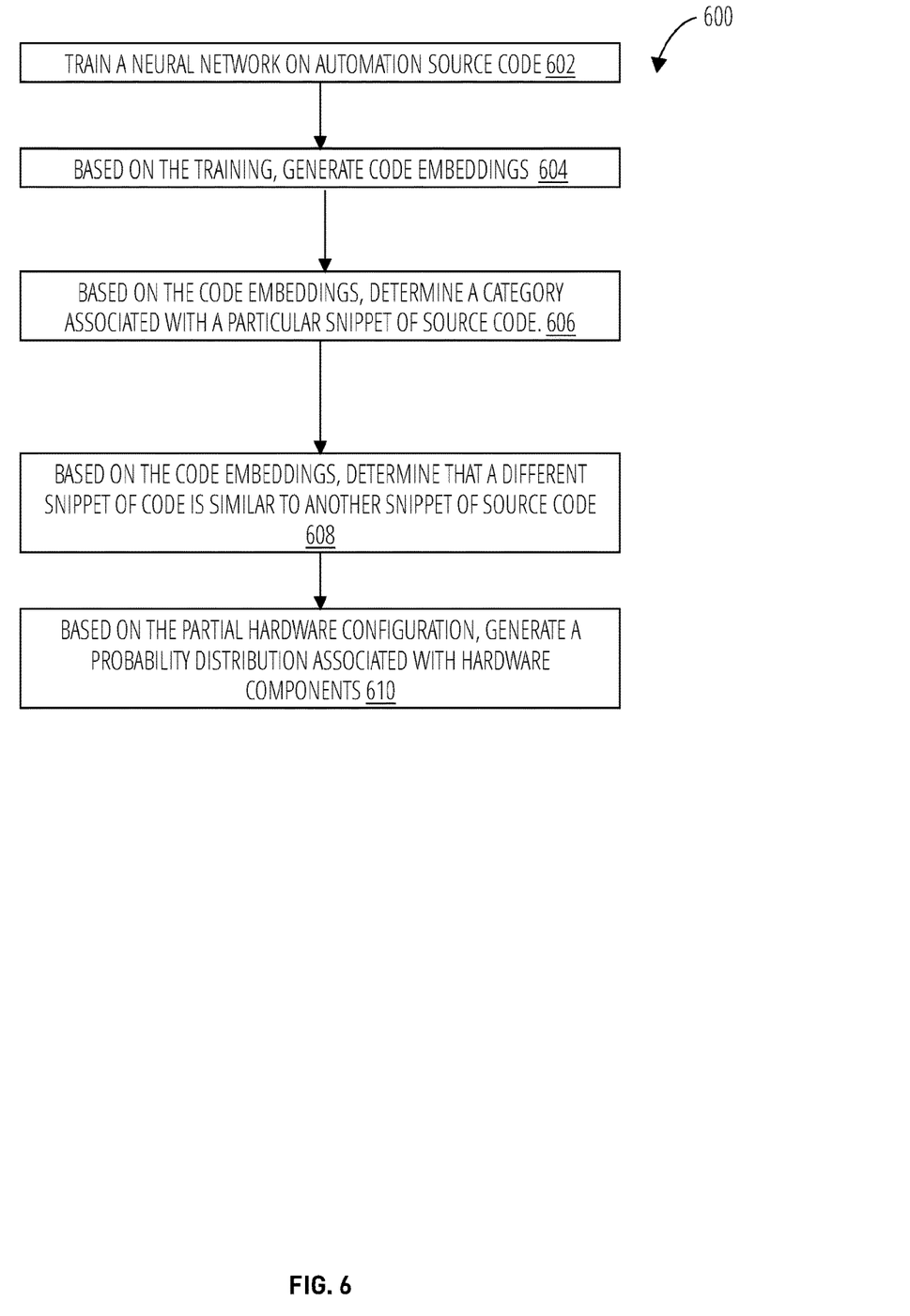
FIG. 6 is a flow diagram that shows example operations that can be performed by the automation engineering system in accordance with an example embodiment.

Referring now to FIG. 6, a computing system, for instance the automation engineering system 100, can perform example operations 600 so as to perform various automation engineering tasks. At 602, the system can train a neural network based on automation source code. For instance, a neural network of the learning module 108 can be configured to learn programmable logic controller (PLC) source code for programmable logic controllers (PLCs) and automation source code for manufacturing systems. At 604, the system can generate code embeddings based on the training. For example, the learning module 108 can be configured to, based on learning the PLC source code and the automation source code, generate code embeddings that define snippets of PLC source code and snippets of automation source code as respective vectors in space. At 606, based on the code embeddings, the system can determine a category associated with a particular snippet of code.

For example, the code classification module 102 can receive a PLC code embedding from the learning module 108, wherein the PLC code embedding defines a snippet of PLC source code as vectors in space. Based on the PLC code embedding, the code classification module 102 can determine a category associated with the snippet of PLC source code. Alternatively, or additionally, the code classification module 102 can be further configured to
receive a manufacturing code embedding from the learning module 108, wherein the manufacturing code embedding defines a snippet of automation source code as vectors in space. Based on the manufacturing code embedding, the code classification module 108 can determine a category associated with the snippet of automation source code. In some cases, the system can extract a plurality of features from the PLC source code and the automation source code. The system can include the feature selection module 126 that can be configured to select certain features or combinations of features from the plurality of features extracted from the PLC source code and the automation source code. The neural network can be tuned based on the one or more selected features or the combinations of selected features. For example, the features selection module 126 can be configured to provide the selected features from the PLC source code and the automation source code in one or more combinations to the learning module, so as to tune the learning module based on the one or more combinations of selected features.

Still referring to FIG. 6, at 608, the system can determine that a different snippet of code is similar to a given snippet of source code. For example, the system can include the semantic code search module 104 that can be configured to receive a PLC code embedding from the learning module. Based on the PLC code embedding, the semantic code search module 104 can determine that a different snippet of code defines a neighbor near the vectors in space of the snippet of PLC source code, so as to determine that the different snippet of code is similar to the snippet of PLC source code. Alternatively, or additionally, the system can generate a specific manufacturing code embedding that defines a specific snippet of automation source code as vectors in space. Based on the manufacturing code embedding, the semantic code search module 104 can determine that a different snippet of code defines a neighbor near the vectors in space of the specific snippet of automation source code, so as to determine that the different snippet of code is similar to the specific snippet of automation source code. In particular, the semantic code search module 104 can generate a score associated with the neighbor as compared to the vectors in space, so as to determine that the different snippet of code is similar to the given source code (e.g., PLC source code or automation source code) in terms of code syntax or code function. In some cases, the semantic code search module 104 can be further configured to score the neighbor as compared to the vectors in space so as to determine that the different snippet of code is similar to the snippet of source code (e.g., PLC source code or automation source code) in terms of code function, and dissimilar in terms of code syntax.

With continuing reference to FIG. 6, at 610, the system can generate a probability distribution associated with hardware components based on a partial hardware configuration. For example, the hardware recommendation module 106 can be configured to learn hardware configurations for complete automation engineering tasks. The hardware recommendation module can be further configured to receive a partial hardware configuration. Based on learning the hardware configurations, the hardware recommendation module 106 can determine a plurality of hardware components and respective probabilities associated with the plurality of hardware components. The respective probabilities can define select hardware components of the plurality of hardware components that complete the partial hardware configuration, so as define a full hardware configuration for completing an automation engineering task.

Figure 7:
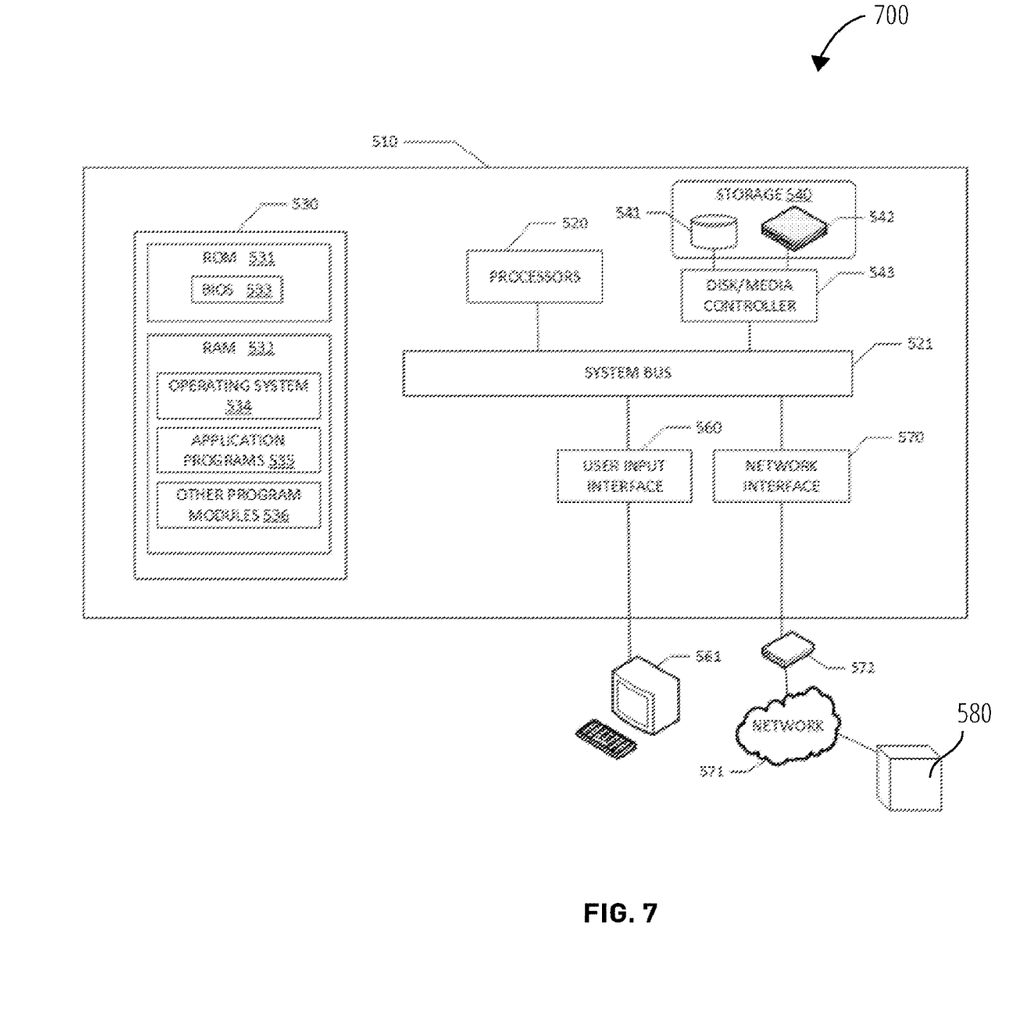
FIG. 7 shows an example of a computing environment within which embodiments of the disclosure may be implemented.

FIG. 7 illustrates an example of a computing environment within which embodiments of the present disclosure may be implemented. A computing environment or automation engineering system 700 includes a computer system 510 that may include a communication mechanism such as a system bus 521 or other communication mechanism for communicating information within the computer system 510. The computer system 510 further includes one or more processors 520 coupled with the system bus 521 for processing the information. For example, the code classification module 102, the semantic code search module 104, the hardware recommendation module 106, and the learning module 108 may include, or be coupled to, the one or more processors 520.

The processors 520 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 520 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device. The system bus 521 may include at least one of a system bus, a memory bus, an address bus, or a message bus, and may permit exchange of information (e.g., data (including computer-executable code), signaling, etc.) between various components of the computer system 510.

The system bus 521 may include, without limitation, a memory bus or a memory controller, a peripheral bus, an accelerated graphics port, and so forth. The system bus 521 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 7, the computer system 510 may also include a system memory 530 coupled to the system bus 521 for storing information and instructions to be executed by processors 520. The system memory 530 may include computer readable storage media in the form of volatile and/or nonvolatile memory, such as read only memory (ROM) 531 and/or random access memory (RAM) 532. The RAM 532 may include other dynamic storage device(s) (e.g., dynamic RAM, static RAM, and synchronous DRAM). The ROM 531 may include other static storage device(s) (e.g., programmable ROM, erasable PROM, and electrically erasable PROM). In addition, the system memory 530 may be used for storing temporary variables or other intermediate information during the execution of instructions by the processors 520. A basic input/output system 533 (BIOS) containing the basic routines that help to transfer information between elements within computer system 510, such as during start-up, may be stored in the ROM 531. RAM 532 may contain data and/or program modules that are immediately accessible to and/or presently being operated on by the processors 520. System memory 530 may additionally include, for example, operating system 534, application programs 535, and other program modules 536. Application programs 535 may also include a user portal for development of the application program, allowing input parameters to be entered and modified as necessary.

The operating system 534 may be loaded into the memory 530 and may provide an interface between other application software executing on the computer system 510 and hardware resources of the computer system 510. More specifically, the operating system 534 may include a set of computer-executable instructions for managing hardware resources of the computer system 510 and for providing common services to other application programs (e.g., managing memory allocation among various application programs). In certain example embodiments, the operating system 534 may control execution of one or more of the program modules depicted as being stored in the data storage 540. The operating system 534 may include any operating system now known or which may be developed in the future including, but not limited to, any server operating system, any mainframe operating system, or any other proprietary or non-proprietary operating system.

The computer system 510 may also include a disk/media controller 543 coupled to the system bus 521 to control one or more storage devices for storing information and instructions, such as a magnetic hard disk 541 and/or a removable media drive 542 (e.g., floppy disk drive, compact disc drive, tape drive, flash drive, and/or solid state drive). Storage devices 540 may be added to the computer system 510 using an appropriate device interface (e.g., a small computer system interface (SCSI), integrated device electronics (IDE), Universal Serial Bus (USB), or FireWire). Storage devices 541, 542 may be external to the computer system 510.

The computer system 510 may also include a field device interface 565 coupled to the system bus 521 to control a field device 566, such as a device used in a production line. The computer system 510 may include a user input interface or GUI 561, which may comprise one or more input devices, such as a keyboard, touchscreen, tablet and/or a pointing device, for interacting with a computer user and providing information to the processors 520.

The computer system 510 may perform a portion or all of the processing steps of embodiments of the invention in response to the processors 520 executing one or more sequences of one or more instructions contained in a memory, such as the system memory 530. Such instructions may be read into the system memory 530 from another computer readable medium of storage 540, such as the magnetic hard disk 541 or the removable media drive 542. The magnetic hard disk 541 and/or removable media drive 542 may contain one or more data stores and data files used by embodiments of the present disclosure. The data store 540 may include, but are not limited to, databases (e.g., relational, object-oriented, etc.), file systems, flat files, distributed data stores in which data is stored on more than one node of a computer network, peer-to-peer network data stores, or the like. The data stores may store various types of data such as, for example, skill data, sensor data, or any other data generated in accordance with the embodiments of the disclosure. Data store contents and data files may be encrypted to improve security. The processors 520 may also be employed in a multi-processing arrangement to execute the one or more sequences of instructions contained in system memory 530. In alternative embodiments, hard-wired circuitry may be used in place of or in combination with software instructions. Thus, embodiments are not limited to any specific combination of hardware circuitry and software.

As stated above, the computer system 510 may include at least one computer readable medium or memory for holding instructions programmed according to embodiments of the invention and for containing data structures, tables, records, or other data described herein. The term "computer readable medium" as used herein refers to any medium that participates in providing instructions to the processors 520 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 541 or removable media drive 542. Non-limiting examples of volatile media include dynamic memory, such as system memory 530. Non-limiting examples of transmission media include coaxial cables, copper wire, and fiber optics, including the wires that make up the system bus 521. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 1300 may further include the computer system 510 operating in a networked environment using logical connections to one or more remote computers, such as remote computing device 580. The network interface 570 may enable communication, for example, with other remote devices 580 or systems and/or the storage devices 541, 542 via the network 571. Remote computing device 580 may be a personal computer (laptop or desktop), a mobile device, a server, a router, a network PC, a peer device or other common network node, and typically includes many or all of the elements described above relative to computer system 510. When used in a networking environment, computer system 510 may include modem 572 for establishing communications over a network 571, such as the Internet. Modem 572 may be connected to system bus 521 via user network interface 570, or via another appropriate mechanism.

Network 571 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 510 and other computers (e.g., remote computing device 580). The network 571 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 571.

It should be appreciated that the program modules, applications, computer-executable instructions, code, or the like depicted in FIG. 7 as being stored in the system memory 530 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 510, the remote device 580, and/or hosted on other computing device(s) accessible via one or more of the network(s) 571, may be provided to support functionality provided by the program modules, applications, or computer-executable code depicted in FIG. 1 and/or additional or alternate functionality. Further, functionality may be modularized differently such that processing described as being supported collectively by the collection of program modules depicted in FIG. 1 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 1 may be implemented, at least partially, in hardware and/or firmware across any number of devices.

It should further be appreciated that the computer system 510 may include alternate and/or additional hardware, software, or firmware components beyond those described or depicted without departing from the scope of the disclosure. More particularly, it should be appreciated that software, firmware, or hardware components depicted as forming part of the computer system 510 are merely illustrative and that some components may not be present or additional components may be provided in various embodiments. While various illustrative program modules have been depicted and described as software modules stored in system memory 530, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An automation engineering system comprising:
   one or more modules;
   a processor for executing the one or more modules; and
   a memory for storing the one or more modules, the one or more modules comprising:
      a learning module configured to learn programmable logic controller (PLC) source code for programmable logic controllers (PLCs) and automation source code for manufacturing systems; and
      based on learning the PLC source code and the automation source code, generate code embeddings that define snippets of PLC source code and snippets of automation source code as respective vectors in space.

2. The automation engineering system of claim 1, the one or more modules of the automation engineering system further comprising a code classification module configured to:
   receive a PLC code embedding from the learning module, the PLC code embedding defining a snippet of PLC source code as vectors in space; and
   based on the PLC code embedding, determine a category associated with the snippet of PLC source code.

3. The automation engineering system of claim 1, the code classification module further configured to:
   receive a manufacturing code embedding from the learning module, the manufacturing code embedding defining a snippet of automation source code as vectors in space; and
   based on the manufacturing code embedding, determine a category associated with the snippet of automation source code.

4. The automation engineering system of claim 1, the one or more modules further comprising a feature selection module configured to:
   select features that are extracted from the PLC source code and the automation source code; and
   provide the selected features from the PLC source code and the automation source code in one or more combinations to the learning module, so as to tune the learning module based on the one or more combinations of selected features.

5. The automation engineering system of claim 1, the one or more modules further comprising a semantic code search module configured to:
   receive a PLC code embedding from the learning module, the PLC code embedding defining a snippet of PLC source code as vectors in space; and
   based on the PLC code embedding, determine that a different snippet of code defines a neighbor near the vectors in space of the snippet of PLC source code, so as to determine that the different snippet of code is similar to the snippet of PLC source code.

6. The automation engineering system of claim 1, the one or more modules further comprising a semantic code search module configured to:
   receive a manufacturing code embedding from the learning module, the manufacturing code embedding defining a snippet of automation source code as vectors in space; and
   based on the manufacturing code embedding, determine that a different snippet of code defines a neighbor near the vectors in space of the snippet of automation source code, so as to determine that the different snippet of code is similar to the snippet of automation source code.

7. The automation engineering system of claim 5, wherein the semantic code search module is further configured to score the neighbor as compared to the vectors in space so as to determine that the different snippet of code is similar to the snippet of PLC source code in terms of code syntax or code function.

8. The automation engineering system of claim 7, wherein the semantic code search module is further configured to score the neighbor as compared to the vectors in space so as to determine that the different snippet of code is similar to the snippet of PLC source code in terms of code function, and dissimilar in terms of code syntax.

9. The automation engineering system of claim 1, the one or more modules further comprising a hardware recommendation module configured to:
   receive a partial hardware configuration;
   based on the partial hardware configuration, generate a probability distribution associated with hardware components; and
   based on the probability distribution, identify a predetermined number of hardware components for completing the partial hardware configuration.

10. A method performed by a computing system, the method comprising:
   training a neural network on programmable logic controller (PLC) source code for programmable logic controllers (PLCs) and automation source code for manufacturing systems;
   based on the training, generating code embeddings that define snippets of PLC source code and snippets of automation source code as respective vectors in space.

11. The method of claim 10, the method further comprising:
   generating a particular PLC code embedding that defines a particular snippet of PLC source code as vectors in space; and based on the particular PLC code embedding, determining a category associated with the particular snippet of PLC source code.

12. The method of claim 10, the method further comprising:
generating a particular manufacturing code embedding that defines a particular snippet of automation source code as vectors in space; and
based on the particular manufacturing code embedding, determining a category associated with the snippet of automation source code.

13. The method of claim 10, the method further comprising:
extracting a plurality of features from the PLC source code and the automation source code;
selecting certain features or combinations of features from the plurality of features extracted from the PLC source code and the automation source code; and
tuning the neural network based on the one or more selected features or combinations of selected features.

14. The method of claim 10, the method further comprising:
generating a specific PLC code embedding that defines a specific snippet of PLC source code as vectors in space; and
based on the specific PLC code embedding, determining that a different snippet of code defines a neighbor near the vectors in space of the specific snippet of PLC code, so as to determine that the different snippet of code is similar to the specific snippet of PLC source code.

15. The method of claim 10, the method further comprising:
generating a specific manufacturing code embedding that defines a specific snippet of automation source code as vectors in space; and
based on the specific manufacturing code embedding, determining that a different snippet of code defines a neighbor near the vectors in space of the specific snippet of automation code, so as to determine that the different snippet of code is similar to the specific snippet of automation source code.

16. The method further of claim 14, the method further comprising:
generating a score associated with the neighbor as compared to the vectors in space so as to determine, based on the score, that the different snippet of code is similar to the snippet of PLC source code in terms of code syntax or code function.

17. The method further of claim 16, wherein generating the score further comprises:
based on the score, determining that the different snippet of code is similar to the snippet of PLC source code in terms of code function, and dissimilar in terms of code syntax.

18. The method of claim 10, the method further comprising:
receiving a partial hardware configuration;
based on the partial hardware configuration, generating a probability distribution associated with hardware components; and
based on the probability distribution, identifying a predetermined number of hardware components for completing the partial hardware configuration.

* * * * *